Jan. 31, 1961  G. A. LYON  2,970,013
WHEEL COVER
Filed Nov. 12, 1957
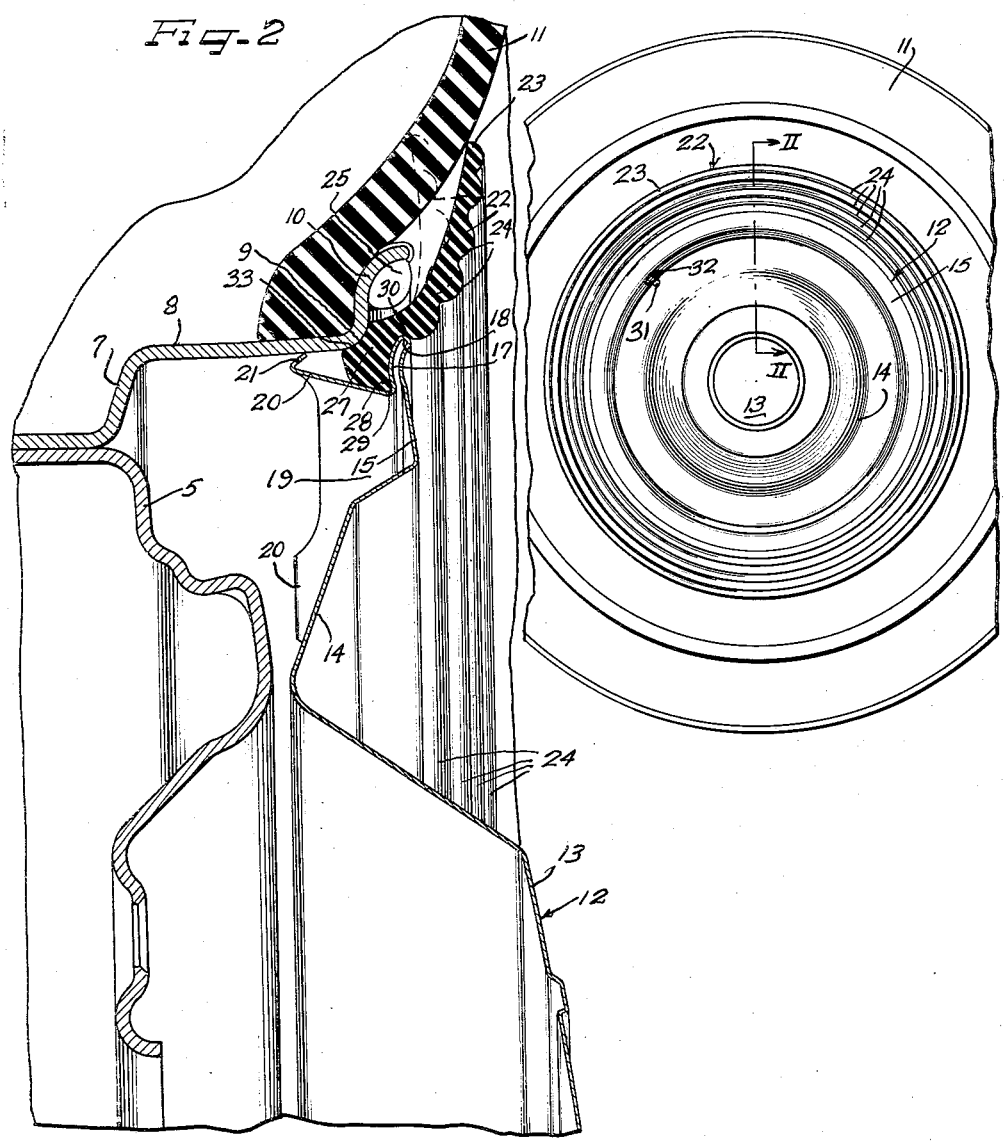
Inventor
GEORGE ALBERT LYON
by Hill, Sherman, Meroni, Gross & Simpson Attys.

United States Patent Office 2,970,013
Patented Jan. 31, 1961

2,970,013

WHEEL COVER

George Albert Lyon, 13881 W. Chicago Blvd., Detroit 28, Mich.

Filed Nov. 12, 1957, Ser. No. 695,743

4 Claims. (Cl. 301—37)

The present invention relates to improvements in wheel structures and more particularly concerns the provision of novel means for providing a wheel with a simulated white or other colored sidewall for a tire on the wheel.

For ornamental purposes, automobile tires are commonly provided with white sidewalls, the remainder of the tire being of a more or less black appearance. The white rubber used for the white sidewall is applied as a veneer and is of a different composition from the remainder or body of the tire and actually requires a different vulcanizing treatment to the extent that the temperature and time of cure are somewhat different from the black rubber of the tire body. This has created some necessity for compromise in the vulcanization of tires with white sidewalls, generally resulting in a sacrifice of quality in the body of the tire including the tread and principal sidewall portions thereof.

To overcome the disadvantages of cure compromise, it has been proposed to secure the white sidewall portion or veneer to the sidewall of the tire after the tire has been vulcanized. Such after-attached sidewall members are inherently liable to such disadvantages as peeling, and the like, and of course require a separate attaching or vulcanizing operation that raises costs.

It has also been heretofore proposed to provide separate simulated white sidewall ring members that are secured clampingly between the terminal flange of the tire rim and the bead portion of the tire and separably hug the sidewall of the tire. Such simulated or mock tire white sidewall rings require, of course, that the tire be deflated in order to install the ring members. Should such simulated white sidewall rings become damaged, it is necessary to deflate the tire not only to remove the damaged ring but also to replace the ring. Furthermore, a disadvantage of such simulated white sidewall rings is that, especially with tubeless tires, there is interference with proper sealing, gripping engagement of the tire bead portion with the opposing surfaces of the tire rim and more particularly the terminal flange between which and the tire bead the simulated white sidewall ring is clampingly interposed.

It is accordingly an important object of the present invention to overcome the foregoing difficulties and disadvantages of the prior expedients and to provide a simulated tire sidewall of improved appearance and which can be applied, or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member, which is adapted to be so related to the outer side of the tire and the tire rim that the tire is afforded a deeper, more massive appearance.

Still another object of the invention is to provide a novel tire sidewall simulating ring member especially adapted for use with a self-retaining wheel cover.

Yet another object of the invention is to provide a tire sidewall simulating flexible, non-metallic ring member which is adapted to be carried in clamped engagement with the outer side of a tire rim.

It is also an object of the invention to provide a non-metallic tire sidewall simulating ring device affording substantial possibilities for variable, distinctive ornamental effects.

Other objects, features and advantages of the present invention will be readily apparent from the following detailed description of a preferred embodiment thereof, taken in conjunction with the accompanying drawing, in which:

Figure 1 is an outer side elevational view of a wheel structure embodying features of the invention; and Figure 2 is a fragmentary enlarged radial sectional detail view taken substantially on the line II—II of Figure 1.

The present invention is adapted to be utilized in conjunction with a vehicle wheel including a disk spider wheel body 5 carrying a tire rim 7 of the multi-flange drop center type including an intermediate flange 8 projecting generally axially outwardly and merging on a juncture shoulder 9 with a terminal flange 10. A pneumatic tire 11 of the tubeless type is adapted to be supported by the tire rim.

Ornamentally and protectively disposed over the outer side of the wheel is a wheel cover 12 which is shown as of the full disk type, although it may if preferred comprise a trim ring type of cover assembled on the wheel and suitably related to a central separate hub cap member. In the present instance the cover 12 includes a crowned generally axially outwardly projecting central portion 13 having thereabout an intermediate generally axially inwardly dished annular portion 14 at the radially outer side of which is a generally radially outwardly projecting annular marginal portion 15 extending to a diameter for substantially overlying the intermediate flange 8 and the juncture shoulder 9 of the tire rim. In a preferred form the radially outermost extending portion of the marginal portion 15 is turned slightly concavely to provide an annular axially outwardly open groove and with an underturned reenforcing flange 17 disposed behind and generally complementary to and slightly spaced from the concave marginal portion, and providing at juncture therewith a smooth reenforcing and finishing edge bead like formation 18. The flange 17 projects substantially radially inwardly beyond the diameter of the intermediate flange 8 and has extending therefrom generally axially inwardly and obliquely radially outwardly a continuous annular flange 19 having a plurality of short resilient retaining finger extensions 20 and terminating in generally radially outwardly oblique short and stiff terminal flanges 21 that are retainingly grippingly engageable under tension of the retaining fingers with the inner face of the intermediate flange 8 for retaining the cover on the wheel.

The cover 12 may be made from suitable sheet or strip material such as stainless steel, brass, and the like drawn or press-formed into shape. The outer face of the cover may be suitably finished as desired, for example by polishing and plating.

In order to afford a massive appearance for the tire and more particularly the radially inner portion of the outer side of the tire, with a white sidewall appearance or some other suitable colored appearance contrasting ornamentally with the remainder of the tire, an annular non-metallic ring member 22 is provided of a diameter for overlying the tire sidewall radially outwardly from the terminal flange 10 and also to overlie the terminal flange and underlie the radially outer extremity of the marginal portion 15 of the wheel cover and to be clamped against the tire rim to retain the same in place, thereby affording the appearance of the tire sidewall extending at least to the edge of the cover. In the present instance the ring member 22 is adapted to be made from rubber or rubber-like material and more particularly a synthetic rubber material such as butyl which readily adapts itself to molding, coloration, and has other desirable characteristics for this purpose.

In order to generally simulate the outer sidewall of the tire, the ring member 22 is preferably made of a generally arched form, with a radially outer terminal edge 23 that is adapted to engage against the tire sidewall. In order to enhance such engagement and to assure constant hugging, self-positioning engagement of the tip 23 with the tire sidewall and to follow the sidewall in all the operational movements thereof, the ring member is normally adapted to assume a position of its radially outer portion substantially more axially inward relative to the radially inner portion of the ring member than when it is on the wheel so that in the unassembled condition the ring member assumes generally the position shown in dash outline in Figure 2, while in the assembly on the wheel, the ring member assumes the full line position of Figure 2 wherein the radially outer portion is flexed radially outwardly and the tip 23 makes firm contact with the tire sidewall.

In order to enhance the resistance of the ring member 22 to undesirable deformation not only from centrifugal action during running of the wheel on which it is mounted, but also against damage and possibly twisting, and deformation when rubbed against a curb or the like, the the body of the ring member is made of substantial thickness. Ordinarily, this would make the ring member possibly unwieldy from a flexibility standpoint, and in order to afford diaphragm-like flexibility but to reduce undue localized or transverse flexibility, the axially outer, outwardly arched side of the ring member is formed with a series of circular corrugation-like annular ribs 24 which are progressively heavier from the radially outer to the radially inner portion of the ring 22 and thus render the ring relatively more flexible radially outwardly. As may be observed in Fig. 2, the axially inner surface of the exemplary ring 22 opposite the ribs 24 is of continuous concavely arched radially transverse form whereby the maximum thickness mass section and thus stiffness is in the rib areas while there is minimum thickness mass section in the valleys intervening between the ribs. The ribs 24 reenforce the ring and provide axially outwardly projecting buffers, while the intervening valleys afford annular areas of relatively greater flexibility.

At its radially inner margin, the ring member 22 is constructed and arranged for clearing wheel balancing weights 25 that may be applied to the terminal flange 10 in the chamber afforded at the inner concave side of the ring member. To this end, the radially inner extremely or marginal portion of the ring member 22 is provided with an angular generally radially inwardly directed annular continuous seating and retaining flange 27 of substantial thickness. At its radially inner side the flange provides a rib 28 interlocking engaged within a reentrant generally axially inwardly opening annular groove 29 provided at the juncture of the underturned axially inwardly bulgingly directed flange 17 with the retaining flange 19 of the cover. At juncture of the ring flange 27 with the body of the ring member and more particularly at the radially inner side of the radially innermost of the ribs 24, a groove 30 is provided within which the turned edge 18 of the cover is engaged. Through this arrangement the ring member and the cover are interengaged in interlocked relationship for handling as a unit when off of the wheel.

In applying the cover and ring member assembly to the outside of the wheel, a valve stem 31 is registered through a valve stem aperture 32 in the cover portion 14 and the cover is pressed axially inwardly into engaged relation with the wheel. In so doing, the retaining finger terminals 21 engage under radially inward compression and thereby radially outward thrusting tension against the intermediate flange 8 of the tire rim and retain the cover in axially inward pressing engagement of the cover margin and more particularly the underturned flange 17 thereof against the ring member inner marginal flange 27 which is thereby clamped against the tire rim and more particularly the tire rim shoulder 9. The seating portion of the ring member flange 27 has an annular groove 33 generally conforming to the shoulder 9 of the tire rim and thereby assisting in retaining the ring member on the wheel in the clamped engagement of the ring member flange 27. It will be observed that the relationship of the cover edge and the ring member flange 27 is such that the cover edge 18 affords substantial clearance for the substantial thickness of the ring member 22 that intervenes between the cover edge and the wheel weight 25.

For removing the cover from the wheel, the ring member 22 can be flexed axially outwardly and a pry-off tool applied behind the ring member and flange 27 and the cover margin 15 for prying the retaining fingers free from the wheel. As the pry-off progresses, if additional pry-off leverage is needed, the pry-off tool can be moved in behind the ring member flange 27 and engaged against the inner edge of the cover flange 19 between the retaining fingers 20. There are, of course, as many of the retaining fingers circumferentially spaced as desirable for any particular conditions, such as 16 of such fingers.

It will be understood that modifications and variations may be effected without departing from the scope of the novel concepts of the present invention.

I claim as my invention:

1. In a sidewall simulating ring member, a non-metallic ring body cross-sectionally contoured generally simulative of a tire sidewall and adapted for coacting with the radially inner portion of a tire sidewall to appear as a portion of such sidewall, said ring member body having on one face thereof a continuous radially spaced series of concentric ribs affording maximum thickness mass section areas and intervening minimum thickness mass section valleys, said ribs affording stiffness circumferentially and against localized deflection and said valleys facilitating generally diaphragm-like flexing of the ring member, said ring member body being of substantial thickness and generally tapering to a greater thickness inclusive of said ribs and said valleys toward its radially inner margin and having on its inner margin an angular flange of substantially thicker cross-section than the remainder of the body and joined to the remainder of the body on a connecting neck affording a groove adjacent to the radially innermost of said ribs.

2. In a wheel structure including a tire rim for supporting a pneumatic tire therein having a sidewall bulging generally axially and radially outwardly beyond the tire rim, a circular trim structure including a tire sidewall simulating ring member of non-metallic flexible material and of an outside diameter to overlie the bulging side wall of the tire and of an inside diameter to overlie the tire rim, and circular retaining means engageable with the wheel and with the radial inner margin of the ring to retain the same in position, the ring having a plurality of concentric circular ribs on one face affording maximum thickness mass section stiffening areas with intervening minimum mass section and flexibility enhancing valleys and being thereby generally reenforced but capable of efficient axial flexing conformable to the tire sidewall, said ribs being progressively heavier from the radially outer to the radially inner portion of the ring and thereby rendering the radially outer portion of the ring relatively more flexible than the radially inner portion.

3. In a wheel structure including a tire rim for supporting a pneumatic tire therein having a sidewall bulging generally axially and radially outwardly beyond the tire rim, a circular trim structure including a tire sidewall simulating ring member of non-metallic flexible material and of an outside diameter to overlie the bulging sidewall of the tire and of an inside diameter to overlie the tire rim, and circular retaining means engageable with the wheel and with the radial inner margin of the ring to retain the same in position, the ring having a plurality of concentric circular ribs on one face affording maximum thickness mass section stiffening areas with intervening minimum mass section and flexibility enhancing valleys and being thereby generally reenforced but capable of efficient axial flexing conformable to the tire sidewall, said ring having an inner marginal thickened flange and said retaining member having a turned marginal formation providing a generally axially inwardly opening groove defined by the generally axially inwardly directed portions of the marginal formation and within which said thickened flange is interlocked.

4. In a wheel structure including a tire rim having an intermediate generally axially extending flange and a terminal flange at the axially outer end thereof projecting generally radially outwardly and then axially outwardly and the tire rim supporting a pneumatic tire having a side wall bulging generally axially outwardly and extending generally radially outwardly beyond the terminal flange, a tire side wall simulating trim ring of flexible non-metallic material and a diameter to overlie the terminal flange and a substantial adjacent portion of the tire side wall, said ring having on its inner terminus a thickened rib structure bottoming against the juncture of the intermediate and terminal flanges, and a metallic circular cover member including means retainingly engaging with the wheel and a radially outer marginal portion providing a groove within which said ring inner terminus rib is retainingly engaged and clampingly forced against said tire rim flange juncture, said ring comprising a continuous series of concentric ribs affording maximum thickness mass stiffening areas of progressively diminishing cross-sectional mass from the inner terminus rib to the outer terminus of the ring and with junctures between the ribs affording minimum mass section and flexibility enhancing valleys and also of progressively diminishing cross-sectional mass from the radially inner to the radially outer side of the ring whereby the ring is progressively more flexible from its radially inner side to its radially outer side and said concentric ribs effectively resist circumferential and radial distortions of the ring but said valleys enable efficient generally axial flexing of the ring.

References Cited in the file of this patent

UNITED STATES PATENTS

| | | |
|---|---|---|
| 2,016,251 | Lyon | Oct. 1, 1935 |
| 2,407,669 | Lyon | Sept. 17, 1946 |
| 2,440,804 | Lyon | May 4, 1948 |
| 2,493,002 | Lyon | Jan. 3, 1950 |
| 2,733,104 | Lyon | Jan. 31, 1956 |
| 2,737,422 | Barnes | Mar. 6, 1956 |

FOREIGN PATENTS

| | | |
|---|---|---|
| 1,061,278 | France | Nov. 25, 1953 |